(12) United States Patent
Chickmenahalli et al.

(10) Patent No.: US 8,186,748 B2
(45) Date of Patent: May 29, 2012

(54) ENERGY ABSORBER FOR VEHICLE OVERHEAD SYSTEM

(75) Inventors: Arun Chickmenahalli, Ann Arbor, MI (US); Mike Dykman, Lake Orion, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 0 days.

(21) Appl. No.: 12/872,487

(22) Filed: Aug. 31, 2010

(65) Prior Publication Data

US 2012/0049569 A1 Mar. 1, 2012

(51) Int. Cl.
*B60R 21/04* (2006.01)
(52) U.S. Cl. ............. 296/187.05; 296/187.13; 296/214
(58) Field of Classification Search ............. 296/187.03, 296/187.05, 187.13, 210, 214, 39.1, 193.12; 188/371, 376, 377
See application file for complete search history.

(56) References Cited

U.S. PATENT DOCUMENTS

| | | | |
|---|---|---|---|
| 4,131,702 A * | 12/1978 | Alfter et al. ................. 428/76 |
| 5,833,304 A * | 11/1998 | Daniel et al. ................ 296/214 |
| 6,012,764 A * | 1/2000 | Seksaria et al. ........ 296/187.05 |
| 6,036,227 A * | 3/2000 | Lin et al. ..................... 280/751 |
| 6,475,937 B1 | 11/2002 | Preisler et al. |
| 6,652,021 B1 | 11/2003 | Dykman et al. |
| 6,715,592 B2 * | 4/2004 | Suzuki et al. ................ 188/371 |
| 6,733,064 B2 * | 5/2004 | Fox et al. ..................... 296/68.1 |
| 6,887,552 B2 | 5/2005 | Dykman et al. |
| 6,942,076 B2 * | 9/2005 | Suzuki et al. ................ 188/371 |
| 7,052,056 B2 | 5/2006 | Weissenborn et al. |
| 7,182,908 B2 | 2/2007 | Preisler et al. |
| 7,222,896 B2 | 5/2007 | Evans |
| 7,249,662 B2 * | 7/2007 | Itou .............................. 188/377 |
| 7,384,095 B2 | 6/2008 | Cormier et al. |
| 7,513,566 B2 * | 4/2009 | Ludwig ........................ 296/214 |
| 7,677,640 B2 | 3/2010 | Dix et al. |
| 7,708,313 B2 | 5/2010 | Haba et al. |
| 7,810,871 B2 * | 10/2010 | Matsui .................... 296/187.12 |
| 7,866,716 B2 | 1/2011 | Perucca et al. |
| 7,954,883 B2 * | 6/2011 | Benkler et al. .......... 296/187.05 |
| 8,016,331 B2 | 9/2011 | Ralston et al. |
| 2004/0198123 A1 | 10/2004 | Gillingham et al. |

(Continued)

FOREIGN PATENT DOCUMENTS

JP 58053541 * 3/1983

OTHER PUBLICATIONS

The National Highway Traffic Safety Administration's Federal Motion Vehicle Safety Standards 201, "Occupant protection in interior impact."

(Continued)

*Primary Examiner* — Glenn Dayoan
*Assistant Examiner* — Gregory Blankenship
(74) *Attorney, Agent, or Firm* — Grossman, Tucker, Perreault & Pfleger PLLC

(57) ABSTRACT

An energy absorber for an overhead system in a vehicle includes a molded member having one or more corrugated sections, the corrugated sections including a plurality of channels wherein the channels include a top wall and a pair of spaced apart horizontally extending side walls and a base portion extending between channels. The energy absorber may be tuned for a desired impact and be located between a vehicle roof and a headliner to provide occupant impact protection.

50 Claims, 3 Drawing Sheets

U.S. PATENT DOCUMENTS

| | | |
|---|---|---|
| 2005/0057053 A1 | 3/2005 | Evans et al. |
| 2005/0161982 A1* | 7/2005 | Cormier et al. ............... 296/214 |
| 2005/0168015 A1* | 8/2005 | Davey et al. .................. 296/214 |
| 2005/0258668 A1 | 11/2005 | Brown |
| 2006/0103172 A1* | 5/2006 | Veen et al. .................... 296/214 |
| 2007/0046010 A1 | 3/2007 | Haba et al. |
| 2007/0046073 A1* | 3/2007 | Ludwig et al. ................ 296/214 |
| 2007/0182216 A1* | 8/2007 | Ludwig ......................... 296/214 |
| 2008/0122259 A1* | 5/2008 | Matsui ...................... 296/187.12 |
| 2008/0174152 A1 | 7/2008 | Cormier et al. |
| 2008/0265622 A1 | 10/2008 | Benkler et al. |
| 2009/0026800 A1* | 1/2009 | Asenkerschbaumer et al. ........................ 296/187.05 |
| 2009/0152904 A1* | 6/2009 | Arellano et al. ............... 296/214 |
| 2011/0109105 A1 | 5/2011 | Ralston et al. |

OTHER PUBLICATIONS

The National Highway Traffic Safety Administration's Federal Motion Vehicle Safety Standards 581, "Bumper Standard."

\* cited by examiner

ENERGY ABSORBER FOR VEHICLE OVERHEAD SYSTEM

FIELD

The present disclosure relate to the field of energy absorbers for vehicles, particularly for occupant protection in overhead systems in the case of head impact against such systems.

BACKGROUND

Vehicles such as passenger cars, vans, buses, trucks, trains and airplanes generally may have headliners mounted inside the passenger compartment for providing an aesthetic covering for the inside of the sheet metal roof and/or framework under which they may be mounted. Headliners may also be provided for sound absorption, energy absorption and/or concealment of electrical wiring and HVAC ducting and vents.

Such headliners are generally constructed of multiple layers of material joined together and mounted to the roof sheet metal and/or associated framework. Such headliners are often made of materials, such as particleboard, fiberboard, formed plastic, fabric, and foam. For motor vehicles, such headliners may not however meet the requisite Federal head impact compliance standards without additional components being affixed thereon.

More recently, vehicles have become increasingly complex, particularly overhead systems, being equipped with an ever-expanding array of devices. Some of these devices are included for safety, for instance, side air bags and energy absorbing components, while other devices may be included primarily for pleasure, for instance, infotainment systems and elaborate climate control systems. This has lead to complex assemblies called "overhead systems" which include a headliner outfitted with ducting, speakers, wiring harnesses, energy absorbers, consoles, electronic modules and air bags.

The National Highway Traffic Safety Administration's (NHTSA) Federal Motor Vehicle Safety Standard 201 (FMVSS201U), entitled "Occupant Protection in Interior Impact," defines the criteria for upper interior impact protection of an occupant in a motor vehicle. Even with airbags, the vehicle occupant may impact the pillars, roof siderails, windshield (front) header and rear header resulting in passenger car occupant injuries. Head impact with the overhead system may be the cause of many moderate to critical or even fatal passenger car occupant injuries. A variety of constructions have been evaluated to provide compliance, however, most add further complexity and cost to the overhead system by adding multiple components and additional assembly labor and tooling.

It may therefore be desirable to provide a molded energy absorber made of a tunable and relatively lightweight material that only requires attachment to the back surface of a headliner or to the underside of the roof structure.

The Federal Government mandates impact testing and compliance under MVSS 201U to provide vehicles that can protect an occupant from high impact forces. Various components of the overhead system may be impacted at 15 mph with a free motion head form and must exhibit a head injury criterion (HIC) of less than 1000. In particular, the front header, left and right side rails and rear header areas must be compliant.

SUMMARY

In one exemplary embodiment, the present disclosure is directed at an energy absorber for an overhead system in a vehicle, the energy absorber comprising a molded member having a longitudinal axis, engaged to the overhead system and including one or more corrugated sections, the corrugated sections including a plurality of channels having a height. The channels include a top wall and a pair of spaced apart horizontally extending side walls having a length, wherein the length extends in a plane that is not parallel with the longitudinal axis of the member. The horizontally extending side walls have a length that is greater than the height and the member further includes a base portion extending between the channel walls and at least one attachment section for engagement to said overhead system.

In another exemplary embodiment, the present disclosure relates to an energy absorbing system for an overhead system in a vehicle, the system comprising a headliner having a back side and one or more energy absorbers, the absorbers comprising a molded member having a longitudinal axis and including one or more corrugated sections, the corrugated sections including a plurality of channels having a height. The channels include a top wall and a pair of spaced apart horizontally extending side walls having a length, wherein the length extends in a plane that is not parallel with the longitudinal axis of the member and wherein the horizontally extending side walls have a length that is greater than the height. The elongate member further includes a base section extending between the channel walls and at least one attachment section mounting the absorber to said headliner wherein the one or more energy absorbers are attached to the back side of the headliner.

BRIEF DESCRIPTION OF THE DRAWINGS

The features, operation and advantages of the invention may be better understood from the following detailed description of the preferred embodiments taken in conjunction with the attached drawings, in which.

Those of ordinary skill in the art will appreciate that elements in the figures are illustrated for simplicity and clarity and have not necessarily been drawn to scale. For example, the dimensions of some of the elements in the figures may be exaggerated relative to other elements to help to improve understanding of the embodiments of the present invention

DETAILED DESCRIPTION

Still other objects and advantages of the present invention will become readily apparent to those skilled in the art from the following detailed description, wherein it is shown and described preferred embodiments of the invention. As will be realized the invention is capable of other and different embodiments, and its several details are capable of modification in various respects, without departing from the invention. Accordingly, the description is to be regarded as illustrative in nature and not as restrictive.

Figure 1:
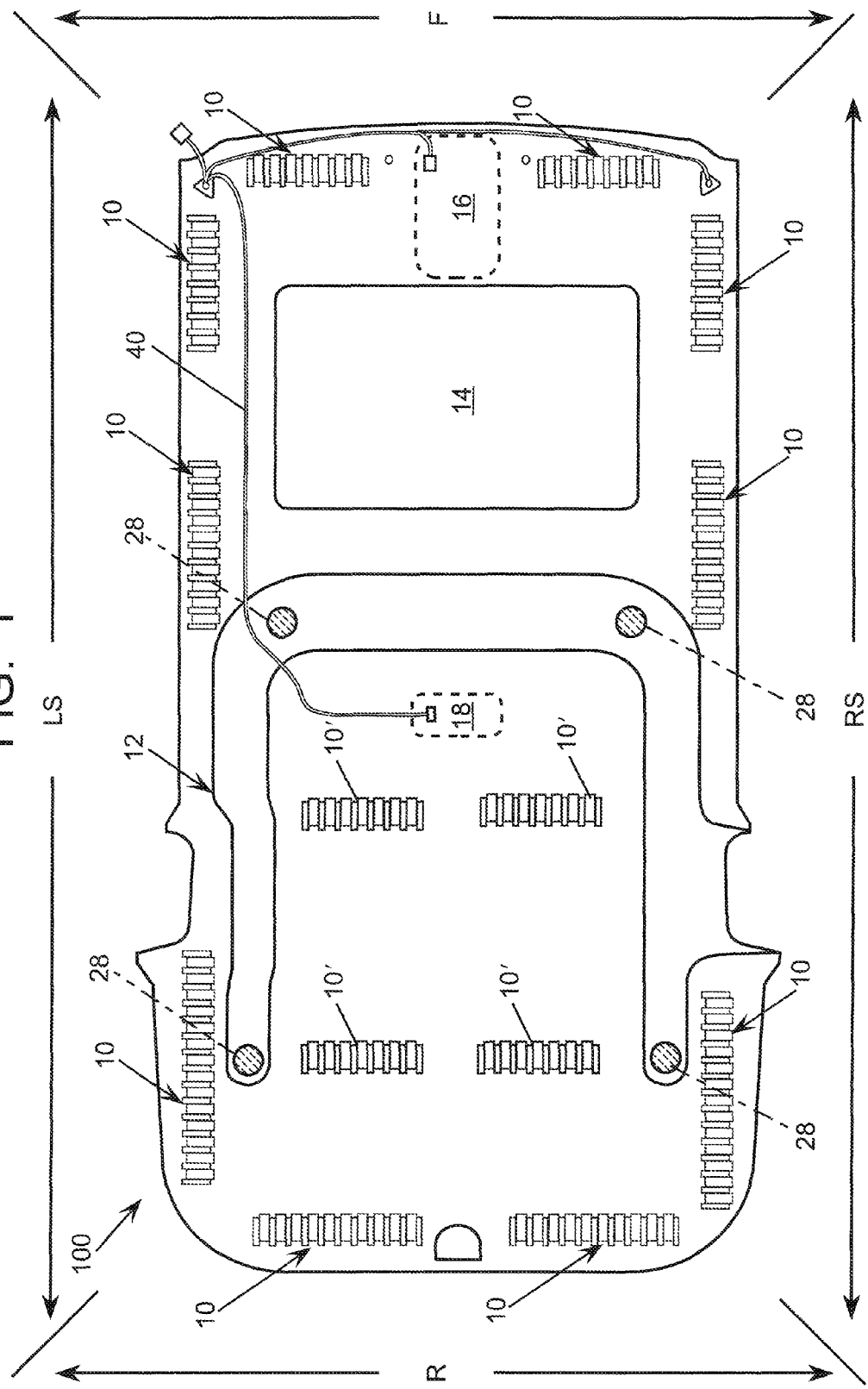
FIG. 1 is a plan view of the back side of an overhead system for a minivan, according to the present disclosure, illustrating some locations where exemplary energy absorbers may be installed.

FIG. 1 illustrates an overhead plan view of the backside of a vehicle headliner assembly 100 (or overhead system) in accordance with the present disclosure. Various features of the headliner assembly 100 include an air duct 12 integrated into the headliner assembly 100 including nozzles 28, an opening 14 for a sun roof, a wiring harness 40, a front console 16 and an overhead light 18. Around the periphery of the assembly are shown a plurality of energy absorbers 10 each comprising a corrugated section comprising a plurality of channels. While shown primarily located in the front header area (F), the side rail areas left side (LS) and right side (RS) and the rear header area (R), it is contemplated that such energy absorbers 10' may be located anywhere within the peripheral confines of the headliner assembly or overhead system.

The energy absorber 10 may be attached directly to the back side of the headliner by mechanical means, preferably by adhesive means (gluing, welding, etc.) The energy absorber may also be attached to the backside of the headliner during it's manufacture by insert-molding the absorber into the body of the headliner. It is further contemplated that additional components such as brackets and clips may be integrated into the energy absorber during it's manufacture to aid in routing wiring, washer hoses and cables.

It is further contemplated that the energy absorber 10 may be attached to the under-side of the metal roof and/or to the metal framework that reinforces the roof and still lie between the headliner or overhead system and the supporting roof. Accordingly, the energy absorber 10 need not be attached to a headliner trim component.

Figure 2:
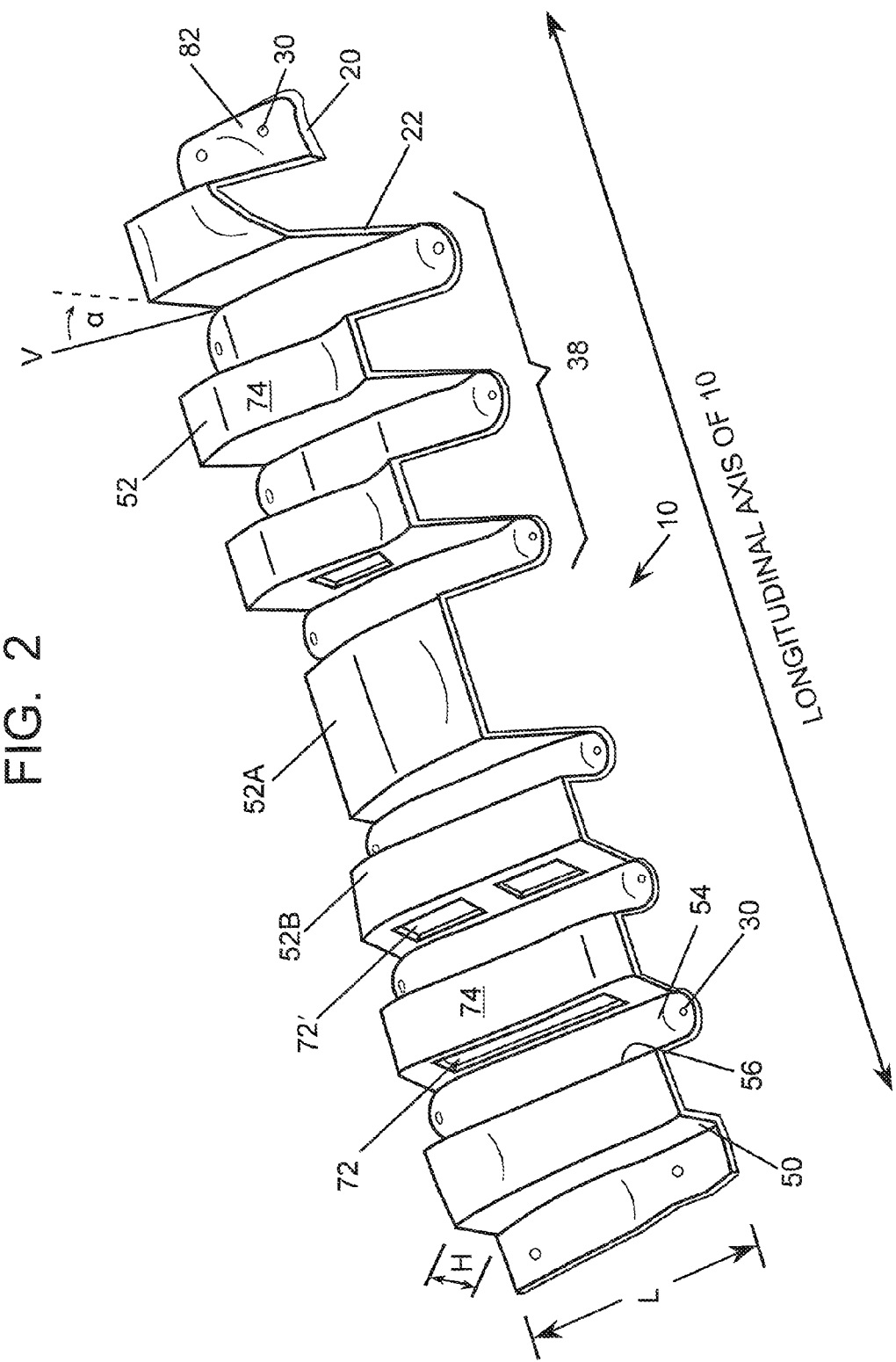
FIG. 2 is a perspective view of the exemplary energy absorber of the present disclosure, as installed as shown in FIG. 1.

FIG. 2 is a perspective view of an exemplary embodiment of the energy absorber 10 of the present disclosure. The energy absorber 10 is preferably longer than its' width and includes a longitudinal axis as shown, the axis configurable in any direction (360°) on the headliner 100 or on the vehicle roof as noted above. The energy absorber 10 further comprises at least one corrugated section 38 which may include a plurality of channels 52.

"Corrugated" as used herein refers to a plurality of channels that have a length dimension generally parallel with one another, the length dimension extending in a plane that is not parallel with the longitudinal axis of the absorber 10.

"Channel" as used herein refers to a structure having a top wall and two side walls, and optionally with one or two end walls, which when mounted in a vehicle, may cooperate to provide a structure for absorbing energy when the channel is subjected to an impact force. The side walls of the channel may correspond to the length dimension of the corrugated section and may extend in a generally horizontal direction when assembled to the back side of a headliner. Preferably, the length (L) of the side walls may be greater than the height (H) of the sidewalls. See again, FIG. 2.

FIG. 2 further shows the energy absorber 10 approximately as would be installed in the area of the rear header (R), front header (F) or side rails (LS), (RS) on the back side of a headliner assembly 100 (see again FIG. 1). The energy absorber 10 may include one or more corrugated sections 38 which may include a plurality of channels 52 which may have different widths 52A, 52B and/or spacing 54 in between. The channels 52 may include side walls 50, 56 and a top wall 74. The channels 52 may also include one or two end walls 80, 82. See FIG. 3. The side walls 50, 56 may include openings of different sizes and shapes 72, 72' or no openings at all 50. The side walls 50, 56 may extend at an angle α that is 0-45° from the vertical V, as shown in FIG. 2. Accordingly, the side walls may form an angle with the base of 90-135°.

As shown in FIG. 2, the length (L) of side walls 50 and 56 (essentially horizontally in-car) may be greater than the height (H) of the channels or corrugations, that is, the distance between top wall 74 and base 54 (vertically in-car).

The top wall 74 of the channels 52 may include openings (not shown) or an engagement feature, such as a stepped feature such as 84 (see FIG. 3) which may complement the inside surface of the roof of the vehicle.

Figure 3:
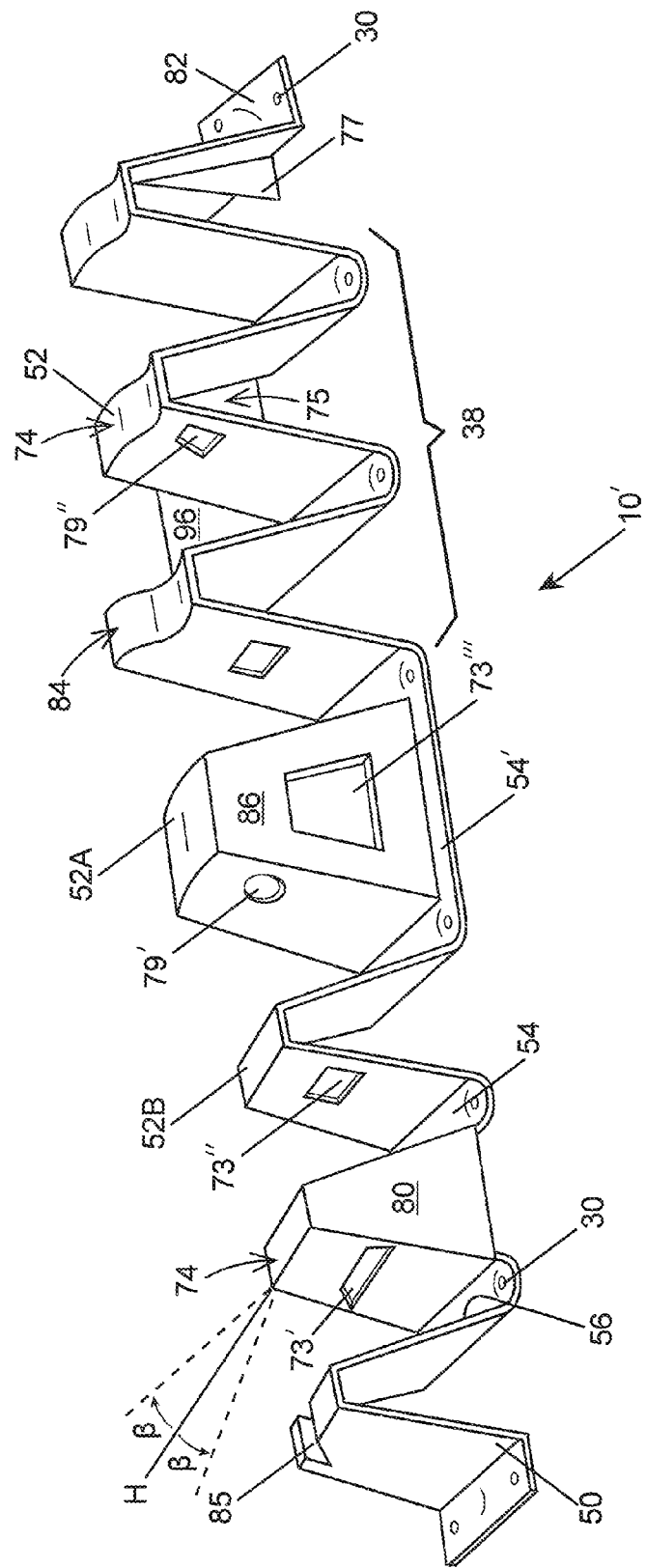
FIG. 3 is a different perspective view of an exemplary energy absorber of the present disclosure, illustrating numerous features that may be added or deleted to tune the impact performance at various locations along that energy absorber.

The energy absorber 10 may further include a base portion 54 which interconnects the channels 52 and may extend outward from the channels 52 to form a full or partial periphery 54' (see FIG. 3). The base portion 54 may comprise attachment section 82, including attachment openings 30. The attachment openings and/or attachment sections may be reinforced with metal at prescribed locations by insert-molding such during the injection molding process of the absorber 10.

The channels may be of different widths, 52 vs. 52A vs. 52B, to accommodate different impact requirements across or along the headliner. While shown here as a generally planar shape, it is contemplated that the energy absorber 10 may be formed to shape to curve to conform to the general roof contour of the vehicle and/or to wrap around the corners of the headliner and provide corner impact protection.

In comparative free motion headform impact testing at 15 mph, the energy absorber 10 of the present disclosure has been found to equal or improve upon the performance of competitive products, such as 4 pcf polyurethane foam, expanded polystyrene bead absorbers and cup-shaped vacuum-formed absorbers, providing a HIC(d) value of 633-689.

The energy absorber 10 may be "tuned" to provide a desired level of resistance to impact forces. FIG. 3 is a perspective view of another exemplary embodiment of the energy absorber 10' of the present disclosure, illustrating a variety of "tools" that may be used to tune, or adjust, the impact performance.

For example, the side walls 50, 56 of the channels may have openings or windows 73', 73", 79', 79" extending therethrough. By removing the material that would otherwise occupy this space, the strength and resistance to deformation, for instance, bending, crushing or crumpling, of the channels can be modified. Additionally, end walls 80, 86 may be provided to further stiffen the structure, or ribs 75, 77 that are transverse to the primary extending side walls 50, 56 of the channel 52 (in other words, substantially parallel with the longitudinal axis of the absorber 10) may be added, thus providing a further connection between the primary side walls and the top wall 74, thereby increasing the resistance of the channels to distortion upon impact. These transverse walls and/or ribs may also include openings or windows, for instance 73''' disposed therein to allow for further "tuning" of the energy absorber's resistance to impact forces. The thickness (22 vs. 20 in FIG. 2) of the walls and/or base may be varied to tune the impact performance for the specific location in the headliner assembly. In addition, the thickness of the individual walls themselves may not be constant and may vary over a given wall area.

Further "tuning" of the energy absorber may be possible to allow different portions of the energy absorber to provide differing levels of resistance to impact forces. For example, as shown in FIG. 3, the use of a rib 77 on only one side of a channel 52 may leave the channel stronger or more resistant to crumpling on the side where the rib is located as compared with the opposite side of the channel where no rib has been attached. The rib 77 may extend only a short distance from the inside of side wall 56 or may extend (see 75) nearly the full width between walls 50 and 56.

Further, as shown in FIG. 3, flange portion 96 may extend locally, generally at an angle to the base 54, to provide edge stiffness and control distortion of the base 54 during impact. In addition, the base 54 which connects the channels 52, may extend across the bottom of the channels (see 54') to provide additional stiffness at the ends of the side walls 50, 56.

Additionally, the opening or window 79" in the primary walls 50 of the channel 52 may be positioned such that a center of the opening or window may be closer to one end of the channel and more distant from the other end. This off-center positioning of the window opening will make the end of the channel that is closer to the center of the window/opening weaker than the end of the channel that is more distant from the center of the window/opening.

Placing a transverse wall 86 along one end of a channel 52 and defining an opening 73''' within that wall may permit even greater latitude in designing energy absorbers having a differing resistance to impact along the energy absorber's horizontal axis. This may be useful to provide local structure and impact resistance to an area that might, for instance, have a more stringent impact requirement.

Still further "tuning" of the energy absorber of the present disclosure may be possible by varying the height, depth, width, thickness and number of the channels 52. Varying the height of one channel relative to an adjacent channel may allow a stepped impact response as opposed to a gradual or uniform impact response, and may allow for greater penetration of the impacting body. Varying the width (longitudinally) of the channels (52 vs. 52A vs. 52B in FIG. 2), number and spacing of the channels may allow the impact protection to be spread over a larger or smaller area, and combined with the other tuning factors described herein, may allow local tuning to address angled impacts.

Further, as shown in FIG. 3, the side walls of the channels 50, 56 may be angled along the horizontal plane H (in-car) by an angle β of ±45° from the longitudinal axis.

Another significant factor in "tuning" is the material for formation of the energy absorber. It is contemplated that the energy absorber 10 of the present disclosure may be formed preferably as a single piece molding (i.e., monolithic) although multiple pieces, such as corrugations may also be assembled together. Plastics are particularly useful for forming energy absorbers according to the present disclosure because they can be relatively rapidly molded into complex shapes with varying thickness, including openings, straps, ribs, additional walls, etc. in a single operation. Further, plastics are of relatively light weight and may have metal insert-molded into their construction for reinforcement, for instance of attachment sections 82.

Additionally, attachment opening 30 may include an insert-molded metal section having a threaded hole for attachment.

As noted above, attachment is preferably by adhesive means, or by insert-molding the absorber into the headliner during it's manufacture.

The energy absorber 10 may be produced by, for instance, injection molding, compression molding, blow-molding (two or more at a time), transfer molding or combinations thereof, or other processes known to those skilled in the art.

Suitable plastics may include thermoplastic and thermosetting resins. Examples of particularly useful resins may include polypropylene and polyurethane. More specific examples from which such energy absorbers may be formed are homopolymers and copolymers of polyethylene, homopolymers and copolymers of polypropylene, thermoplastic olefins, thermoplastic and thermosetting urethanes, polycarbonate, acrylonitrile-butadiene-styrene and blends of acrylonitrile-butadiene-styrene and polycarbonate. Additionally, the plastic resins used in the manufacture of the subject energy absorber may be reinforced with fibers, such as glass or natural fibers, particles, such as talc or calcium carbonate, and other fillers up to and including about 40% by weight to further tailor such properties as stiffness (modulus), elongation, notched impact resistance and tear strength. The plastic resin may also be foamed (for instance, foamed polypropylene).

The absorber 10 may preferably comprise a high flow, high impact polypropylene copolymer resin such as Pro-fax® SG802N from LyondellBasell Industries or a crystalline homopolymer polypropylene resin.

Generally, the wall thickness of the absorber 10 will be in the range of about 1.0 to about 3.0 mm in increments of 0.1 mm, for instance, 1.1 mm, 1.2 mm, 1.3 mm, etc. As noted, the thickness may vary within an absorber 10 as shown at reference numeral 20 vs. 22 in FIG. 2. Thicker sections of the absorber 10 may be formed by gas assist molding.

The channels 52 may generally be, for instance, up to about 150 mm in length (width of the energy absorber 10), about 10-100 mm or greater in width (across car) and about 10-30 mm in height (H) (top wall 74 to base 54). The channels may be separated by a distance of about 10 to about 100 mm. The energy absorber 10 may have an overall length (L) of 600 mm or even greater. The energy absorber 10 may be formed into a contoured or curved shape to conform to the back side of the headliner or underside of the vehicle roof, or to extend around a corner of the headliner.

The energy absorber 10 may be placed in any location in an overhead system and be oriented at any angle, 0-360°, in a roughly horizontal plane.

Using the above described methods and principles, an energy absorber may be designed and mounted to the overhead system of a vehicle such that the energy absorbing requirements of MVSS 201U may be satisfied. Again, this is the ability to withstand a 15 mph impact with a free motion headform and generate a HIC(d) value of less than 1000.

While embodiments of the disclosure have been illustrated and described, it is not intended that these embodiments illustrate and describe all possible forms of the disclosure. Rather, the words used in the specification are words of description rather than limitation, and it is understood that various changes may be made without departing from the spirit and scope of the disclosure.

What is claimed is:

1. An energy absorber for an overhead system in a vehicle, the energy absorber comprising:
   a molded member to engage to said overhead system, said molded member having a longitudinal axis, and including one or more corrugated sections, the corrugated sections including a plurality of channels having a height;
   wherein the channels include a top wall and a pair of spaced apart horizontally extending side walls having a length, wherein said length extends in a plane that is not parallel with said longitudinal axis of said member;
   wherein said length of said horizontally extending side walls is greater than said height;
   wherein the member further including a base extending between said channel walls and at least one attachment section for engagement to said overhead system; and
   wherein one or more of said side walls of at least one of the channels include one or more ribs.

2. The energy absorber of claim 1, wherein the side walls of the plurality of channels extend generally parallel to one another.

3. The energy absorber of claim 1, wherein at least one of the channels further include one or more end walls.

4. The energy absorber of claim 1, wherein one or more of said side walls of at least one channel include one or more openings.

5. The energy absorber of claim 4, wherein at least one of said side walls of at least one channel include at least two openings of different sizes.

6. The energy absorber of claim 1, wherein one or more of said side walls of said plurality of channels each include one or more ribs.

7. The energy absorber of claim 1, wherein said base further includes a flange section extending at an angle therefrom.

8. The energy absorber of claim 1, wherein said base and at least one of said side walls of at least one channel have a different thickness from one another or vary in thickness therewithin.

9. The energy absorber of claim 1, wherein said side walls of at least one channel extend generally horizontally, ±45° from said longitudinal axis.

10. The energy absorber of claim 1, wherein said side walls of at least one channel form an angle with said base of 90-135°.

11. The energy absorber of claim 1, wherein said plurality of channels vary in height.

12. The energy absorber of claim 1, wherein said molded member is configured to be located at a front header area, a rear header area or a side rail area of said overhead system.

13. The energy absorber of claim 1, wherein said overhead system includes a headliner having a back side and said at least one attachment section of said molded member is to adhesively attach said molded member to said back side.

14. The energy absorber of claim 1, wherein said plurality of channels vary in width.

15. The energy absorber of claim 1, wherein said plurality of channels have a spacing between said channels wherein said spacing varies in distance.

16. The energy absorber of claim 1, wherein said top wall of at least one channel includes an engagement feature for a metal roof of the vehicle.

17. The energy absorber of claim 1, wherein said member comprises injection molded thermoplastic.

18. The energy absorber of claim 1, wherein said member comprises polypropylene.

19. The energy absorber of claim 1, wherein said base and at least one of said side walls of at least one channel have a thickness in a range of 1.0 mm. to 3.0 mm.

20. The energy absorber of claim 1, wherein said plurality of channels are separated by 10 mm to 100 mm.

21. An energy absorbing system for an overhead system in a vehicle, the system comprising:
    a headliner having a back side;
    one or more energy absorbers, said absorbers comprising a molded member having a longitudinal axis, and including one or more corrugated sections, the corrugated sections including a plurality of channels having a height;
    wherein the channels include a top wall and a pair of spaced apart horizontally extending side walls having a length, wherein said length extends in a plane that is not parallel with said longitudinal axis of said member;
    wherein said length of said horizontally extending side walls is greater than said height;
    wherein the member further including a base extending between said channel walls and at least one attachment section for attaching said absorber to said headliner;
    wherein said one or more energy absorbers are attached to said back side of said headliner; and
    wherein one or more of said side walls include one or more ribs.

22. The energy absorbing system of claim 21, wherein one or more of said side walls of at least one channel include one or more openings.

23. The energy absorbing system of claim 21, wherein said member comprises injection molded thermoplastic.

24. The energy absorbing system of claim 21, wherein said member comprises polypropylene.

25. The energy absorbing system of claim 21 wherein said base and at least one of said side walls of at least one channel have a thickness in a range of 1.0 mm. to 3.0 mm.

26. An energy absorber for an overhead system in a vehicle, the energy absorber comprising:
    a molded member to engage to said overhead system, said molded member having a longitudinal axis, and including one or more corrugated sections, the corrugated sections including a plurality of channels having a height;
    wherein the channels include a top wall and a pair of spaced apart horizontally extending side walls having a length, wherein said length extends in a plane that is not parallel with said longitudinal axis of said member;
    wherein said length of said horizontally extending side walls is greater than said height;
    wherein the member further including a base extending between said channel walls and at least one attachment section for engagement to said overhead system; and
    wherein said base further includes a flange section extending at an angle therefrom.

27. The energy absorber of claim 26, wherein the side walls of the plurality of channels extend generally parallel to one another.

28. The energy absorber of claim 26, wherein at least one of the channels further include one or more end walls.

29. The energy absorber of claim 26, wherein one or more of said side walls of at least one channel include one or more openings.

30. The energy absorber of claim 29, wherein at least one of said side walls of at least one channel include at least two openings of different sizes.

31. The energy absorber of claim 26, wherein one or more of said side walls of at least one channel include one or more ribs.

32. The energy absorber of claim 26, wherein said plurality of channels vary in height.

33. The energy absorber of claim 26, wherein said plurality of channels vary in width.

34. The energy absorber of claim 26, wherein said plurality of channels have a spacing between said channels wherein said spacing varies in distance.

35. The energy absorber of claim 26, wherein said plurality of channels are separated by 10 mm to 100 mm.

36. An energy absorber for an overhead system in a vehicle, the energy absorber comprising:
    a molded member to engage to said overhead system, said molded member having a longitudinal axis, and including one or more corrugated sections, the corrugated sections including a plurality of channels having a height;
    wherein the channels include a top wall and a pair of spaced apart horizontally extending side walls having a length, wherein said length extends in a plane that is not parallel with said longitudinal axis of said member;
    wherein said length of said horizontally extending side walls is greater than said height;
    wherein the member further including a base extending between said channel walls and at least one attachment section for engagement to said overhead system;
    wherein at least one of the channels further include one or more end walls; and wherein one or more of said side walls of at least one channel include one or more openings.

37. The energy absorber of claim 36, wherein the side walls of the plurality of channels extend generally parallel to one another.

38. The energy absorber of claim 36, wherein said plurality of channels each further include one or more end walls.

39. The energy absorber of claim 36, wherein said base further includes a flange section extending at an angle therefrom.

40. The energy absorber of claim 36, wherein at least one of said side walls of at least one channel include at least two openings of different sizes.

41. The energy absorber of claim 36, wherein one or more of said side walls of at least one channel include one or more ribs.

42. The energy absorber of claim 36, wherein said plurality of channels vary in height.

43. The energy absorber of claim 36, wherein said plurality of channels vary in width.

44. The energy absorber of claim 36, wherein said plurality of channels have a spacing between said channels wherein said spacing varies in distance.

45. The energy absorber of claim 36, wherein said plurality of channels are separated by 10 mm to 100 mm.

46. The energy absorber of claim 36, wherein the one or more openings are rectangular.

47. The energy absorber of claim 36, wherein the one or more openings are circular.

48. The energy absorber of claim 36, wherein the one or more openings are trapezoidal.

49. The energy absorber of claim 36, wherein the one or more openings are elongated.

50. The energy absorber of claim 36, wherein at least one of the channels further include one or more end walls; and
the one or more of said end walls-of at least one channel include one or more openings.

* * * * *